(12) United States Patent
Shih

(10) Patent No.: US 7,232,252 B1
(45) Date of Patent: Jun. 19, 2007

(54) LIGHT HOLDER FOR MOTOR VEHICLES

(75) Inventor: Ming-Chang Shih, Tainan (TW)

(73) Assignee: Yu Min Co., Ltd., Tainan (TW)

( * ) Notice: Subject to any disclaimer, the term of this patent is extended or adjusted under 35 U.S.C. 154(b) by 0 days.

(21) Appl. No.: 11/277,847

(22) Filed: Mar. 29, 2006

(51) Int. Cl.
*B60Q 1/00* (2006.01)

(52) U.S. Cl. ............ 362/650; 362/647; 362/649; 362/496

(58) Field of Classification Search ........ 362/640, 362/647, 650, 652, 655, 656, 496, 498, 648, 362/649, 186, 487, 494, 473
See application file for complete search history.

(56) References Cited

U.S. PATENT DOCUMENTS

| | | | | |
|---|---|---|---|---|
| 2,595,331 A | * | 5/1952 | Calihan et al. | ............ 362/494 |
| 4,714,987 A | * | 12/1987 | Dene | ............ 362/352 |
| 4,782,433 A | * | 11/1988 | Rombough | ............ 362/186 |
| 5,546,283 A | * | 8/1996 | Ohtsuka et al. | ............ 362/528 |
| 6,017,136 A | * | 1/2000 | Burton | ............ 362/273 |
| 2006/0092653 A1 | * | 5/2006 | Tachiiwa et al. | ............ 362/507 |

* cited by examiner

*Primary Examiner*—Thomas M. Sember
(74) *Attorney, Agent, or Firm*—Alan Kamrath; Kamrath & Associates PA

(57) ABSTRACT

A light holder for motor vehicles includes a transparent lighting housing and a snapping member. The transparent lighting housing includes an internal space and an opening at one end of terminating the internal space and terminating in a bottom inner surface. The a snapping member includes a snapping section atone end, a plurality of latches extending from the snapping section, and a threaded shank at the other end. The snapping section is inserted into the opening, and the threaded shank is adapted to be secured to a motor vehicle so as to provide an easily detachable light holder for a motor vehicle.

7 Claims, 3 Drawing Sheets

LIGHT HOLDER FOR MOTOR VEHICLES

BACKGROUND OF THE INVENTION

1. Field of Invention

The present invention relates to lights for motor vehicles and, more particularly, to a light holder for motor vehicles which is easily detachable for users to change.

2. Related Art

Conventionally, lights are formed integrally with a motor vehicle (e.g., car or motorcycle). However, integral lights suffered from a couple of disadvantages. For example, the whole light is required to be replaced with a new one if only a component thereof is damaged due to, for example, a traffic accident. Further, a user cannot replace the existing light with another one of a different shape. Thus, the need for improvement still exists.

SUMMARY OF THE INVENTION

It is therefore an object of the present invention to provide a detachable light holder for motor vehicles such that the whole light is not required to be replaced with a new one if only a component thereof is damaged.

It is another object of the present invention to provide a detachable light holder for a motor vehicle such that a user is allowed to replace the light with another one of a different shape.

To achieve the above and other objects, the present invention provides a light holder for a motor vehicle including a transparent lighting housing and a snapping member. The transparent lighting housing includes an internal space, an opening at one end, and a shoulder at a joining portion of the opening and the space. The snapping member includes a snapping section at one end, a plurality of latches extending from the snapping section, and a threaded shank at the other end. The snapping section is inserted into the opening, and the threaded shank is adapted to be secured to a motor vehicle so as to provide an easily detachable light holder for motor vehicles.

The above and other objects, features and advantages of the present invention will become apparent from the following detailed description taken with the accompanying drawings.

DETAILED DESCRIPTION OF THE INVENTION

Figure 1:
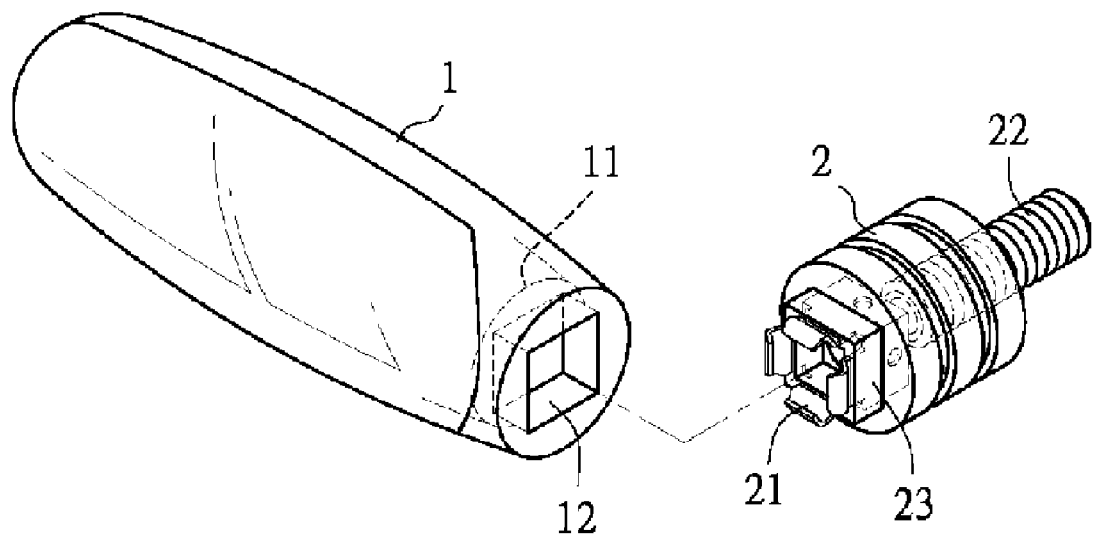
FIG. 1 is an exploded view of a first preferred embodiment of a light holder for motor vehicles according to the invention.
Figure 2:
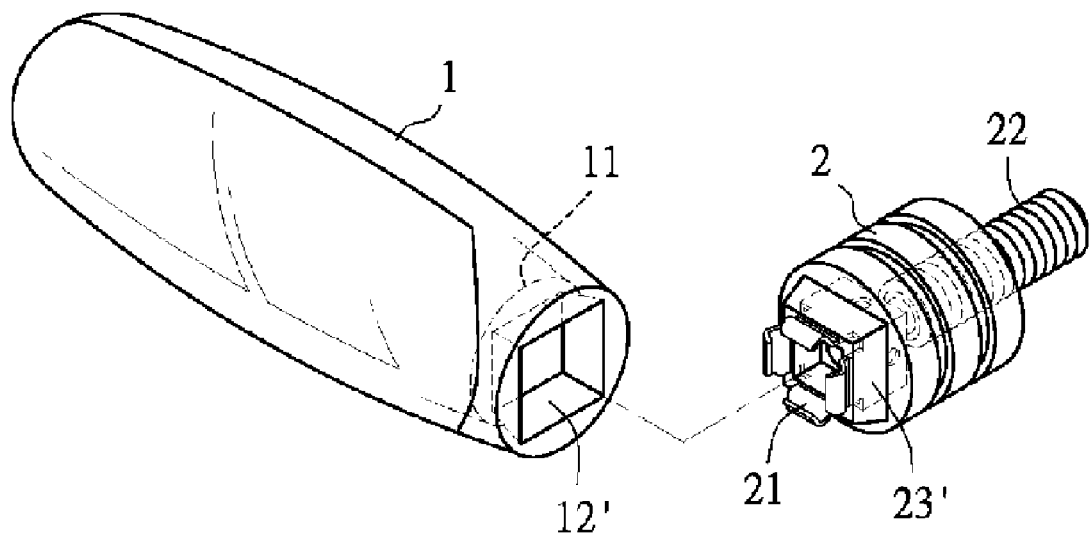
FIG. 2 is an exploded view of a second preferred embodiment of a light holder for motor vehicles according to the invention.

Referring to FIGS. 1 and 2, a light holder for motor vehicles (not shown) in accordance with the invention is illustrated. The light holder comprises a transparent lighting housing 1 combined with a cylindrical snapping member 2. The lighting housing 1 includes an internal space, an inlay opening 12 at one end, and a shoulder at a joining portion of the opening 12 and the space. The opening 12 can have a cross-sectional shape of square, rectangle, round, or rhombus. In a first preferred embodiment, the opening 12 has a square sectional shape and four vertical side walls. In a second preferred embodiment, the four side walls of the inlay opening can also be inwardly tapered, as the opening indicated by the reference number 12' in FIG. 2. The cylindrical snapping member 2 is formed of a flexible material including a snapping section 23 or 23' projected from one end. Four latches 21 respectively extend from sides of the snapping section 23 or 23', and a threaded bar 22 is at the other end of the snapping member 2. The snapping section 23 or 23' is shaped to match with the opening 12 or 12'. In the first embodiment, as shown in FIG. 1, the snapping section 23 has four vertical side walls to fit in the opening 12, and in the second preferred embodiment, the snapping section 23' has four inwardly tapered side walls to fit in the opening 12'.

Figure 3:
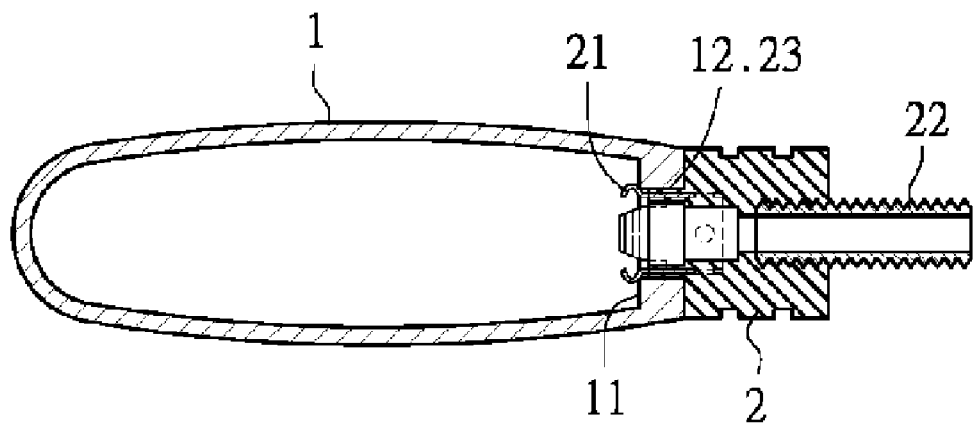
FIG. 3 is a cross sectional view of the assembled light holder in FIG. 1.
Figure 4:
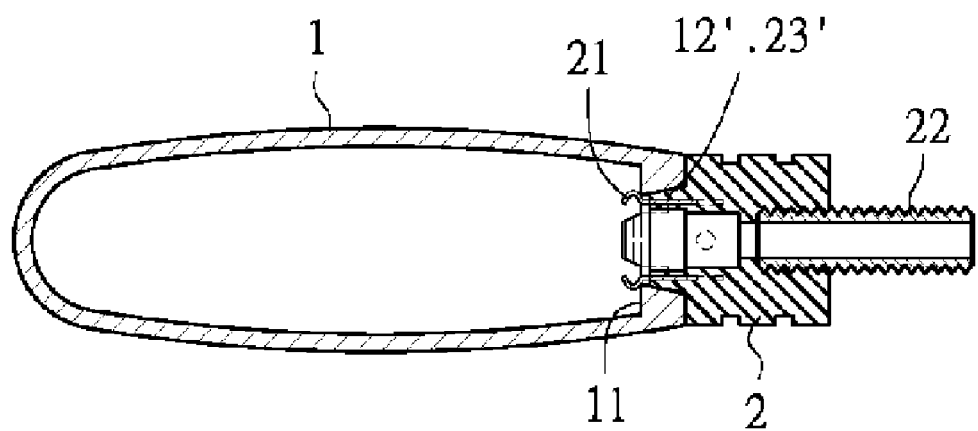
FIG. 4 is a cross sectional view of the assembled light holder in FIG. 2.
Figure 5:
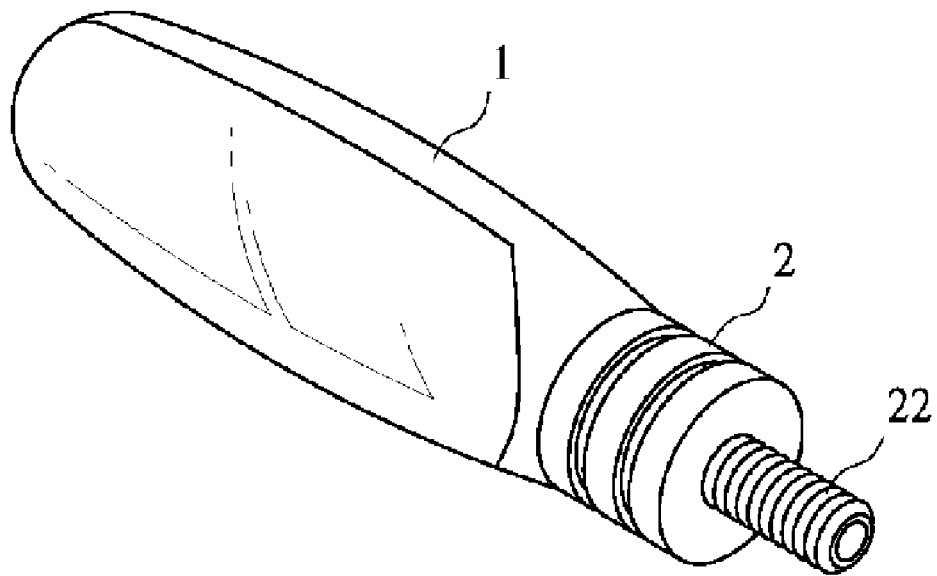
FIG. 5 is a perspective view of the assembled light holder of FIG. 3.

In assembly, referring to FIGS. 3 and 4, the snapping section 23 or 23' is snugly inserted into the opening 12 or 12' until the latches 21 are lockingly engaged with the inner surface 11. Thus, the lighting housing 1 and the snapping member 2 are secured together so as to finish the light holder. The light holder can be secured to a motor vehicle (e.g., car or motorcycle) by screwing the threaded bar 22.

Figure 6:
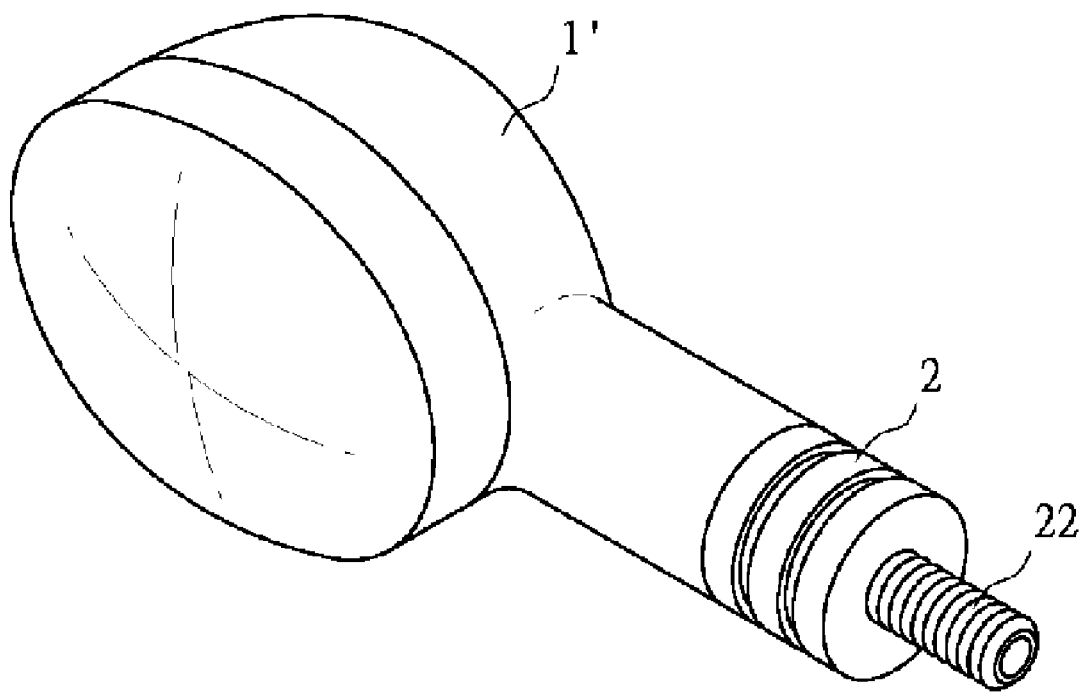
FIG. 6 is a perspective view of another shape of the light holder according to the invention.

Referring to FIG. 6, a user can change the light housing to various shapes, for example, a light housing 1', as shown in FIG. 6.

While the invention herein disclosed has been described by means of specific embodiments, numerous modifications and variations could be made thereto by those skilled in the art without departing from the scope and spirit of the invention set forth in the claims.

What is claimed is:

1. A light holder for motor vehicles, comprising:
    a transparent lighting housing including an internal space, with an opening at one end of the internal space and terminating in a bottom inner surface of the internal space; and
    a snapping member including a snapping section at one end, with the snapping section being of a size and shape for slideable receipt in the opening of the internal space, with a plurality of latches extending from a first end of the snapping section, and with a threaded shank extending from an opposite end of the snapping member, with the plurality of latches extending opposite to the threaded shank, with the snapping member, the snapping section, the plurality of latches, and the threaded shank being formed as a single member;
    wherein the snapping section is removably inserted into the opening with the plurality of latches extending through the opening and located within the internal space and locking engaging with the bottom inner surface of the internal space inside of the internal space to secure the lighting housing and the snapping member together, and the threaded shank is adapted to be secured to a motor vehicle.

2. The light holder for a motor vehicle of claim 1, wherein each of the opening and the snapping section has a cross-sectional shape of square, rectangle, round, or rhombus.

3. The light holder for a motor vehicle of claim 1, wherein each of the opening and the snapping section has four inwardly tapered side walls.

4. The light holder for a motor vehicle of claim 1, wherein each of the opening and the snapping section has four vertical side walls.

5. The light holder for a motor vehicle of claim 1, wherein the light housing can have various shapes.

6. The holder of claim 5, wherein flexible material is selected from one of rubber, plastic, acryl and bakelite.

7. The holder of claim 1, wherein the snapping member is formed of a flexible material.

\* \* \* \* \*